Jan. 28, 1941. H. U. GARRETT 2,230,107
INSERTABLE AND REMOVABLE FLOW VALVES
Filed June 23, 1939 2 Sheets-Sheet 1

INVENTOR.
Henry Udell Garrett
BY Hastings W. Baker
ATTORNEY.

Jan. 28, 1941.  H. U. GARRETT  2,230,107
INSERTABLE AND REMOVABLE FLOW VALVES
Filed June 23, 1939   2 Sheets-Sheet 2
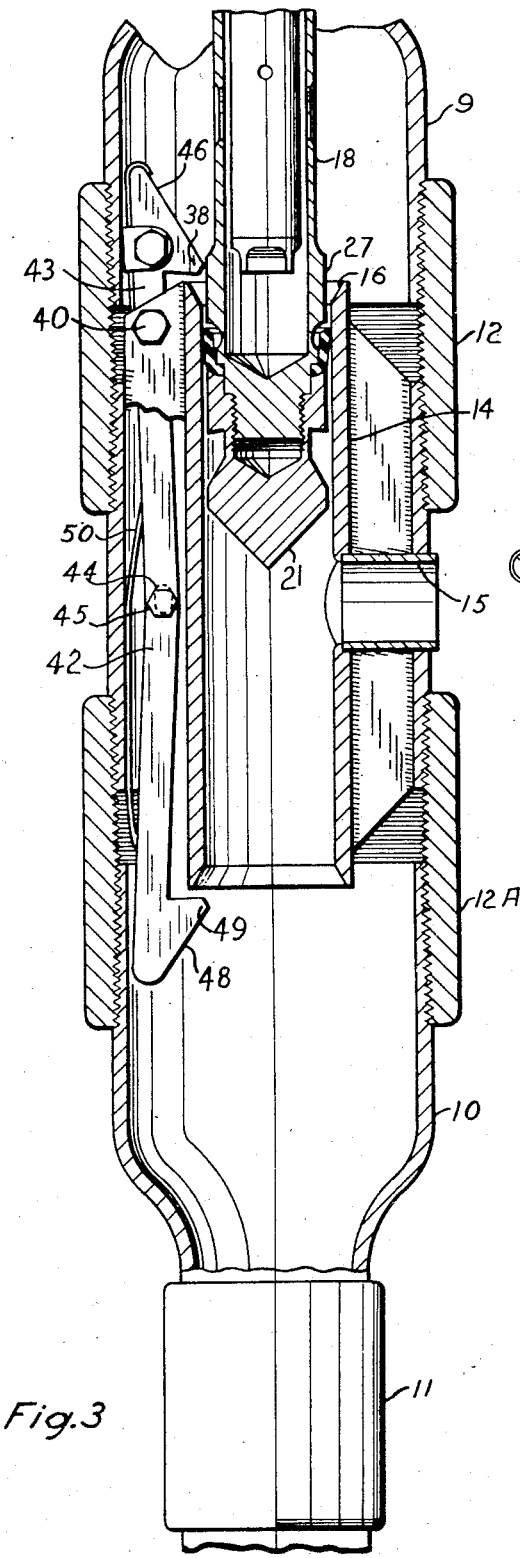
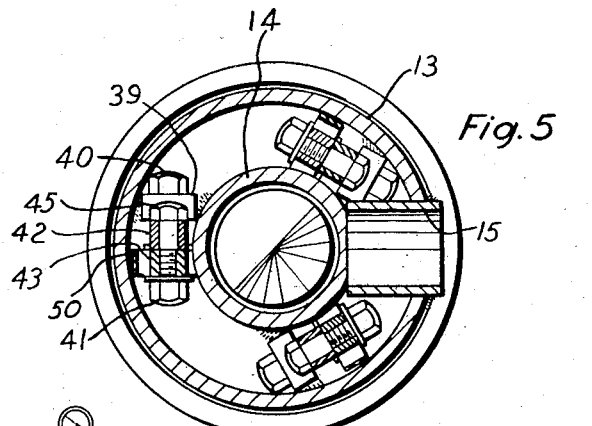
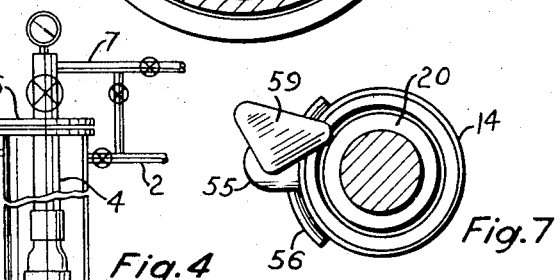
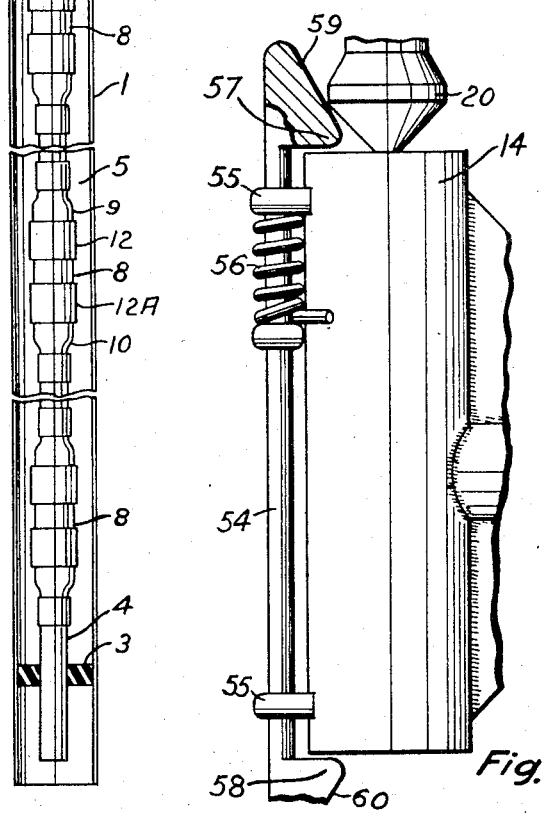
INVENTOR.
Henry Udell Garrett
BY Hastings W. Baker
ATTORNEY.

Patented Jan. 28, 1941

2,230,107

UNITED STATES PATENT OFFICE 2,230,107

INSERTABLE AND REMOVABLE FLOW VALVES

Henry Udell Garrett, Dallas, Tex., assignor to The Guiberson Corporation, Dallas, Tex., a corporation of Delaware Application June 23, 1939, Serial No. 280,695

19 Claims. (Cl. 103—233)

This invention relates to a construction whereby flow valves may be inserted in or removed from the flow line of an oil well. In the past it has been customary to provide flow valves in the flow line of an oil well, but so far as I know, such valves could not be inserted or removed without removing the entire flow line, which requires much time and expense.

I am aware of the fact that in the application of Samuel Allen Guiberson, III, Serial No. 187,173, filed January 27, 1939 one insertable flow valve was shown which could be inserted into or removed from the flow line without the necessity of removing the flow line, but my invention goes beyond what was shown in the said application by providing a means whereby a plurality of flow valves may be inserted in the flow line and removed therefrom without removing the flow line.

Another object of the invention is to provide a novel means to lock each of the flow valves in the flow line at the exact position desired.

Another object of the invention is to provide a novel means for releasing the locking means when it is desired to remove the flow valves from the well.

Figure 1:
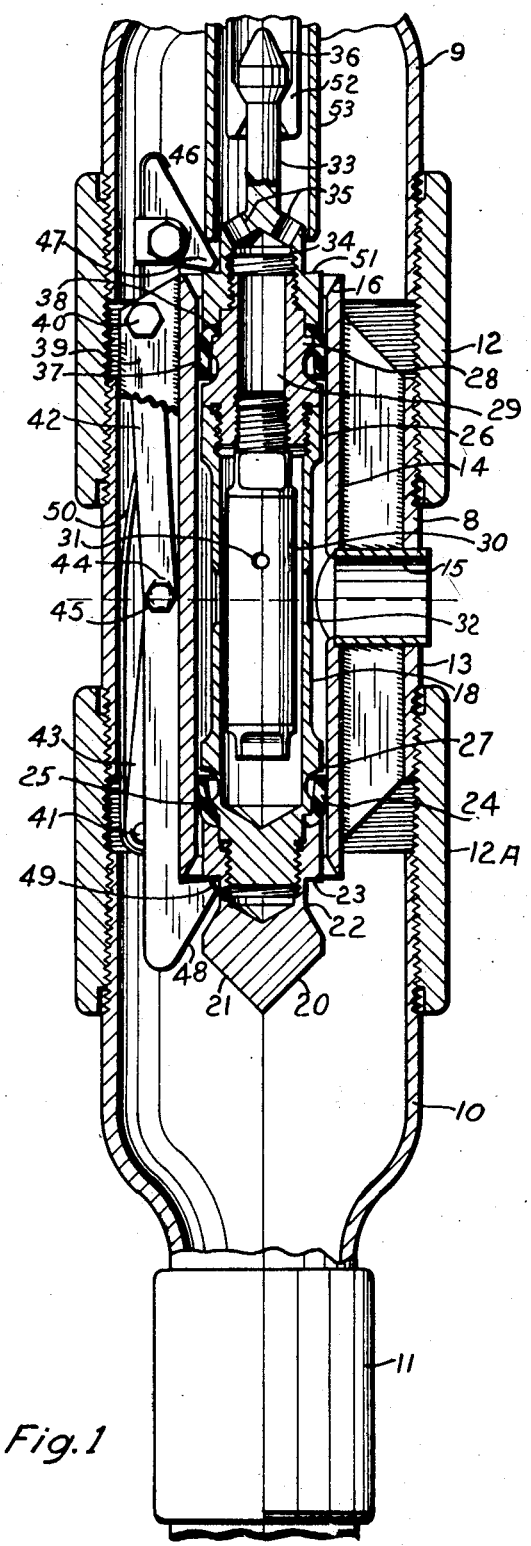
Figure 2:
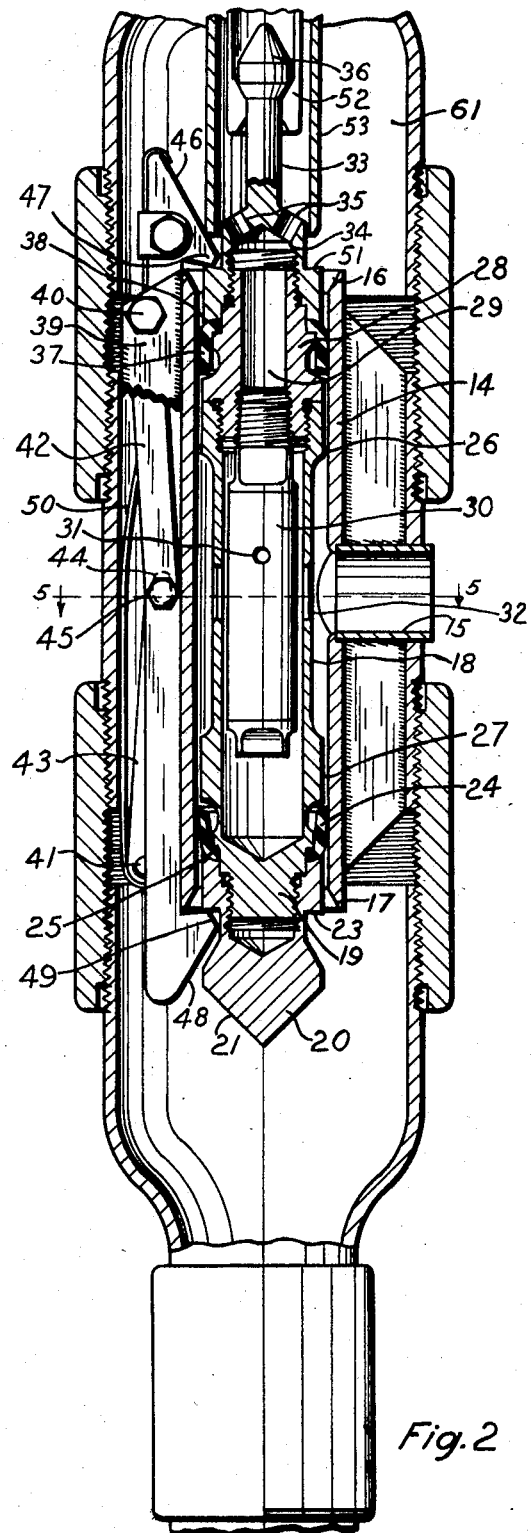

Other objects and advantages of the invention will appear in the detail specification and the claims which follow and in which I have shown and described the preferred embodiments of my invention, not by way of limitation but by way of illustration and in which, Fig. 1 is a side elevational view, largely in cross-section, of a flow line having my invention incorporated therein, Fig. 2 is a view similar to Fig. 1 but showing the noses of the locking means spaced further apart than in Fig. 1 and the housing for the flow valve being longer than what is shown in Fig. 1, Fig. 3 is a view similar to Figs. 1 and 2 but showing the position of the parts when the flow valve and its housing are being removed from the flow line, Fig. 4 is an elevational view partly in cross-section of the entire well system showing the casing, the flow line and parts carried thereby, the packer and the pressure head with the necessary connections, Fig. 5 is a cross-sectional view substantially on the line 5—5 of Fig. 2, Fig. 6 is a side elevational view of a modification of the locking means shown in Fig. 1 and, Fig. 7 is a plan view showing the position of the locking means of the modification shown in Fig. 6 when the housing is being removed from the flow line.

In the drawings similar reference characters indicate corresponding parts.

When it is desired to insert a plurality of flow valves in the flow line, I suggest that the housings for the flow valves and their associated locking mechanisms should be somewhat different for each successive flow valve, that is, I suggest that the housing and the locking means therefor which would be placed lowermost in the well should be somewhat longer than the corresponding parts for the flow valve above it. I have, therefore, shown in Fig. 1 a flow valve mechanism which would be placed in the flow line above the similar part shown in Fig. 2, that is, the structure shown in Fig. 2 would be spaced in the flow line below the structure shown in Fig. 1.

I propose to employ the usual casing 1 and an air inlet pipe 2 for compressed air and provided near the bottom of the well with a packer 3 which seals off the space between the casing 1 and the flow line 4 so that the compressed air which is pumped into the casing 1 will go into a chamber 5 between the flow line and the casing and the pressure from this compressed air or gas will not be communicated to the oil bearing sands because of the packer 3. The conventional pressure head 6 is provided to prevent the escape of compressed air or gas at the top of the well. The flow line 4 extends through the pressure head 6 and communicates with a pipe 7 leading to a reservoir. Of course, the pipes 2 and 7 and the flow line 4 are provided with the necessary control valves.

I provide in the flow line a series of enlarged reservoirs 8. In Fig. 4 I have shown three such reservoirs. Each of them consists of a downwardly flaring pipe 9 and an upwardly flaring pipe 10 connected to the flow line by collars 11. The pipe 9 is externally threaded at its lower end and the pipe 10 is externally threaded at its upper end to receive internally threaded collars 12 and 12A respectively. A short pipe section 13 externally threaded at its opposite ends is screw-threaded to the collars 12 and 12A. A barrel 14 is secured to the reservoir 8 by a conventional means, such as laterally extending arms and an air inlet pipe 15 extends through the pipe section 13 and into the barrel 14, thereby forming a port between the chamber 5, which it will be remembered is the pressure chamber between the casing and the flow line, and leading into the interior cylindrical part of the barrel 14. The barrel 14 is provided with a beveled upper end 16 and a beveled lower end 17 so that when the flow valve is being lowered into or being raised upwardly through the barrel the beveled surfaces 16 and 17 will guide the same into the cylindrical interior of the barrel 14.

The housing for the flow valve consists of a vertically extending chamber member 18 which has a cylindrical interior throughout the most of its length but is closed at its lower end by a threaded plug 19. A cam nipple 20 is screwed on the threads of the plug 19 and is provided with downwardly extending cam surfaces 21 which will cam outwardly the locking means, hereinafter completely described, when the housing is being lowered through the locking member and the plug 19 is also provided with a depression 22 to receive the noses of the locking member after the cam surface 21 has passed beyond the lowermost nose of the locking member so that the locking member would abut against a shoulder 23 forming a part of the nipple 20. A cup-shaped packer 24 is inserted between the upper portion of the nipple 20 and a shoulder 25 near the lower end of the member 18. The upper and lower portions of the member 28 flare outwardly as indicated at 26 and 27 respectively so as to form a loose fitting piston-like effect within the barrel 14. The flared portion 26 is internally screw-threaded and receives a short section 28 which has a bore 29 extending vertically therethrough. A downwardly extending flow valve 30 is screwed into the lower portion of the section 28 and communicates with the bore 29 thereof. This flow valve may be of any construction, but I have shown a flow valve of the type shown and described in the application of Henry Udell Garrett et al., Serial No. 257,806, filed February 23, 1939, which is provided with a plurality of air inlet ports 31 which communicate with the interior of the chamber member 18 and extend into the flow valve. The chamber member 18 is provided with ports 32 so that compressed air may pass through the air inlet pipe 15 from the pressure chamber 5 and through the ports 32 into the interior of the chamber member 18 and through the ports 31 into the flow valve. If a flow valve of the type shown in the said application 257,806 is employed, it will be operated by the differential in the pressure of the air or gas in the chamber 18 and the fluid pressure exerted downwardly through the bore 29 of the section 28 so that when the pressure of the liquid or oil exceeds a predetermined pressure, the flow valve will be operated and the gas will pass upwardly from the flow valve through the bore 29 to aerate the oil above it, as will hereinafter be described more in detail.

The short section 28 is externally screw-threaded at its upper end and receives a grab member 33 which flares outwardly near its lower end, providing a hollow interior 34 with a plurality of ports 35 leading into the same and normally communicating with the oil reservoir 61 which is all of the interior of the reservoirs 8, with the exception of the structural parts enclosed therein. The upper portion of the grab member 33 is provided with a cone-shaped portion 36 which is larger at its greatest diameter than is the portion of the grab member below the same. The lower end of the grab member 33 presses against a downwardly extending cup packer, pressing the same against a shoulder 38 of the short section 28. The lower cup packer 24 and the upper packer 37 provides an effective sealing means to prevent the escape of the gas in the barrel 14.

The barrel 14 is provided with arms 39 which receive pivot studs 40 and 41 on which are pivoted levers 42 and 43 respectively. Each of these levers 42 and 43 are provided with a slot 44 near the middle thereof and a pin 45 passes through the slots of each of the levers so that if either lever is moved outwardly the other lever will have to move therewith. The lever 43 is provided at its upper end with a cam surface 46 and a nose 47 and the lever 42 is provided at its lower end with a cam surface 48 and a nose 49. Leaf springs 50 bear against the inside of the reservoirs 8 and against the free end of said levers so as to press said levers towards the center of the reservoirs. The noses 47 and 49 of the two levers are spaced apart a slightly greater distance than the length of the barrel 14 and slightly more than the distance between the lower shoulder 23 and the upper shoulder 51 so that when the housing for the flow valve is passed into the locking position in the housing the noses 47 and 49 will overlie and underlie the shoulders 51 and 23 respectively and lock the flow valve and its housing into position.

As stated above, I propose to make the barrel 14 for the uppermost flow valve assembly shorter than any of the barrels below it and the next barrel below would be longer than the one above it, but shorter than the one below it, and so on for as many flow valve assemblies as I may employ. The housings for the flow valves would be of substantially the same length as the barrels in which they would rest so that the uppermost housing would be shorter than any of those below it and would progressively increase in length for each successive housing which was to be employed in lower portions of the well. This will, of course, necessitate that the distance between the noses 47 and 49 of the locking mechanism would also have to be correspondingly positioned so that the distance between the noses would be less for the uppermost valve assembly and would progressively increase in the distance between the said noses for each successive and lower valve assembly.

Where a plurality of insertable and removable flow valve assembles, as herein described, are employed, I would first lower the lowermost flow valve housing into the well through the flow line. Let us assume that that is the structure shown in Fig. 2. As it is lowered and comes into contact with the locking mechanism shown in Fig. 1, the cam surface 21 of the nipple 20 would strike the upper cam surface 46 of the lever 43 and move it outwardly. It is true that this upper nose 49 would pass into the reduced portion of the nipple 20 above the cam surface 21, but the shoulder 23 would immediately come into contact with it and would again cam it outwardly so that the entire flow valve housing would pass downwardly beyond the nose 47 of the lever 43. This valve housing is longer than the distance between the noses 47 and 49 of the mechanism shown in Fig. 1 so that when the depression between the cam surface 21 and the shoulder 23 was ready to pass by the nose 49 the upper portion of the valve housing would be holding the nose 47 in its outward position and through the bolt and slot arrangement 44 and 45 the nose 49 would likewise be held in its retracted position until the shoulder 51 had passed beyond the nose 47, but when that had occurred, the housing would be extended partly below the nose 49 and therefore the entire valve housing would pass entirely through the locking means shown in Fig. 1. It would travel downwardly through the flow line until it reached a locking mechanism which corresponded to its length and when it would, the shoulder 23 would be immediately above its locking nose 49 and the shoulder 51 would be immediately below its locking nose 47 so that the springs 50 would move the levers 42 and 43 inwardly so that the nose 49 would underlie the shoulder 23 and the nose 47 would overlie the shoulder 51 thereby securely locking the valve housing in position so that the ports 32 would be in communication with the air inlet pipe 15. In like manner the next succeeding valve structure would be lowered to its correct positon and so on until all the valve mechanisms had been inserted.

When it is desired to remove the successive flow valves from the flow line a grab 52 and a tubular releasing member 53 would be lowered through the flow line. It is well understood that the grab 52 is provided with arms which are pressed outwardly by engaging the cam surface 36 and that they snap over the enlargement when they have passed beyond the enlargement. The releasing member 53 would engage the cam surface 46 of the arm 43 and press the arm outwardly. The outside diameter of the releasing member 53 is substantially the same size as the housing for the valve and the grab 52 can now remove the entire valve housing, carrying the valve upwardly through the flow line and out of the well and the grab and releasing member would then be lowered so as to remove the next valve mechanism and so on until all had been removed.

In the modification shown in Figs. 6 and 7 I propose to use precisely the same type of valve housing and barrel 14. The only difference exists in the locking mechanism which consists of a rod 54 which is journaled in bearings 55. A spring 56 is attached to the rod 54 and is twined about the said rod and its other end presses against the barrel 14', the spring tending to turn the rod 54 so that the noses 57 and 58 will be in the position shown in Fig. 6 so as to overlie and underlie respectively the barrel 14' and the housing therein. Each of these noses is provided with cam surfaces 59 and 60 corresponding to the cam surfaces 46 and 48 respectively. In inserting and removing the valve housing, the operations would be precisely as hereinbefore described, except that the noses 57 and 58 would be turned angularly so as to be out of the path of movement of the housing when you were inserting or removing the valve housing instead of moving the noses radially away from the center as shown in Figs. 1 and 2.

I realize that many changes may be made in the specific form of the invention shown by way of illustration in the attached drawings and described in this specification without departing from the spirit of the invention, and I, therefore, desire to claim the same broadly except as I may limit myself in the attached claims.

Having now described my invention, I claim:

1. In a device of the type in which the flow valve in a flow line is adapted to release compressed gases into a column of fluid, said valve being operated by differentials in pressure of the gases and fluid, the combination of, a barrel provided with a cylindrical bore extending therethrough and positioned in said flow line, a flow valve housing adapted to be inserted through said flow line and into said barrel the flow valve being housed within said housing and latching means for the housing to latch it in position in the barrel, said latching means extending above and below the housing so as to overlie and underlie a part thereof when the housing is in position in the barrel.

2. In a device of the type in which the flow valve in a flow line is adapted to release compressed gases into a column of fluid, said valve being operated by differentials in pressure of the gases and fluid, the combination of, a cylindrical barrel fixed in said flow line, a flow valve housing adapted to be lowered through the flow line into said barrel, the flow valve being housed within said housing and locking means adapted to engage the upper and lower parts of the housing to lock it in position when the housing is correctly positioned in the barrel.

3. In a device of the type in which the flow valve in a flow line is adapted to release compressed gases into a column of fluid, said valve being operated by differentials in pressure of the gases and fluid, the combination of, a cylindrical barrel fixed in said flow line, a flow valve housing adapted to be lowered through the flow line into said barrel, the flow valve being housed within said housing, locking means adapted to engage the upper and lower parts of the housing to lock it in position when the housing is correctly positioned in the barrel and means to render the locking means inoperative so as to remove the housing.

4. In a device of the type in which the flow valve in a flow line is adapted to release compressed gases into a column of fluid, said valve being operated by differentials in pressure of the gases and fluid, the combination of, a cylindrical barrel fixed in said flow line, a flow valve housing adapted to be lowered through the flow line into said barrel, locking means adapted to engage the upper and lower parts of the housing to lock it in position when the housing is correctly positioned in the barrel, the flow valve being housed within said housing, means to render the locking means inoperative so as to remove the housing and a grab whereby the housing may be pulled upwardly through the flow line when the locking means has been rendered inoperative.

5. In a device of the type in which the flow valve in a flow line is adapted to release compressed gases into a column of fluid, said valve being operated by differentials in pressure of the gases and fluid, the combination of, a cylindrical barrel fixed in said flow line, a flow valve housing adapted to be lowered through the flow line into said barrel the flow valve being housed within said housing and a locking means including two noses adapted to engage shoulders on the upper and lower parts of the housing to lock it in position when the housing reaches a point between said noses.

6. In a device of the type in which the flow valve in a flow line is adapted to release compressed gases into a column of fluid, said valve being operated by differentials in pressure of the gases and fluid, the combination of, a cylindrical barrel fixed in said flow line, a flow valve housing adapted to be lowered through the flow line into said barrel, the flow valve being housed within said housing, a locking means including two noses adapted to engage shoulders on the upper and lower parts of the housing to lock it in position when the housing reaches a point between said noses and means tending to move the noses so as to to engage said shoulder when the housing is correctly positioned in said barrel.

7. In a device of the type in which the flow valve in a flow line is adapted to release compressed gases into a column of fluid, said valve being operated by differentials in pressure of the gases and fluid, the combination of, a cylindrical barrel fixed in said flow line, a housing provided with upper and lower shoulders and adapted to be lowered through the flow line into said barrel, the flow valve being housed within said housing, a pair of oppositely extending pivoted levers, each of said levers having a nose, one of said noses being above said barrel and the other below it and spring means to move said levers inwardly towards said housing so as to engage said upper and lower shoulders to lock the housing in the barrel when the housing is in position within the barrel.

8. In a device of the type in which the flow valve in a flow line is adapted to release compressed gases into a column of fluid, said valve being operated by differentials in pressure of the gases and fluid, the combination of, a cylindrical barrel fixed in said flow line, a housing provided with upper and lower shoulders and adapted to be lowered through the flow line into said barrel, the flow valve being housed within said housing, a pair of oppositely extending pivoted levers, each of said levers having a nose, one of said noses being above said barrel and the other below it and spring means to move said levers inwardly towards said housing so as to engage said upper and lower shoulders to lock the housing in the barrel when the housing is in position within the barrel, said noses being spaced apart a slightly greater distance than the distance between said shoulders.

9. In a device of the type in which the flow valve in a flow line is adapted to release compressed gases into a column of fluid, said valve being operated by differentials in pressure of the gases and fluid, the combination of, a cylindrical barrel, a housing adapted to be inserted into said barrel, the flow valve being housed within said housing said housing being provided with upper and lower shoulders and locking arms to engage said shoulders to lock said housing within said barrel.

10. In a device of the type in which the flow valve in a flow line is adapted to release compressed gases into a column of fluid, said valve being operated by differentials in pressure of the gases and fluid, the combination of, a cylindrical barrel, a housing adapted to be inserted into said barrel, the flow valve being housed within said housing said housing being provided with upper and lower shoulders and interconnected locking arms to engage said shoulders and lock said housing in said barrel.

11. In a device of the type in which the flow valve in a flow line is adapted to release compressed gases into a column of fluid, said valve being operated by differentials in pressure of the gases and fluid, the combination of, a cylindrical barrel, a housing adapted to be inserted into said barrel, the flow valve being housed within said housing said housing being provided with upper and lower shoulders, locking arms to engage said shoulders and lock said housing in said barrel, and a pin and slot connection between said locking arms so that the said arms will move into or out of locking position simultaneously.

12. In a device of the type in which the flow valve in a flow line is adapted to release compressed gases into a column of fluid, said valve being operated by differentials in pressure of the gases and fluid, the combination of, an upwardly extending lever provided with a locking nose, a downwardly extending lever provided with a locking nose, a housing having a height slightly less than the distance between said noses and adapted to be lowered through said flow line so as to be positioned between said locking noses the flow valve being housed within said housing and means to move said levers so as to project the noses above and below the housing when the housing is between the said noses.

13. In a device of the type in which the flow valve in a flow line is adapted to release compressed gases into a column of fluid, said valve being operated by differentials in pressure of the gases and fluid, the combination of, an upwardly extending lever provided with a locking nose, a downwardly extending lever provided with a locking nose, a housing having a height slightly less than the distance between said noses and adapted to be lowered through said flow line so as to be positioned between said locking noses, the flow valve being housed within said housing, means to move said levers so as to project the noses above and below the housing when the housing is between the said noses, and means to release said noses from said housing so that the housing may be pulled from the flow line.

14. In a device of the type in which the flow valve in a flow line is adapted to release compressed gases into a column of fluid, said valve being operated by differentials in pressure of the gases and fluid, the combination of, an upwardly extending lever provided with a locking nose, a downwardly extending lever provided with a locking nose, a housing having a height slightly less than the distance between said noses and adapted to be lowered through said flow line so as to be positioned between said locking noses, the flow valve being housed within said housing and means to move said levers so as to project the noses above and below the housing when the housing is between the said noses, said noses and housing being provided with cam surfaces so as to displace said noses when the housing is being moved into position between the noses.

15. In a device of the type in which a plurality of flow valves in a flow line are adapted to release compressed gases into a column of fluid, said valves being operated by differentials in the pressure of the gases and the fluid, the combination of, a series of cylindrical barrels fixed to the flow line at different depths, a valve housing for each of said barrels, there being one flow valve in each housing each of said housings below the uppermost one being of a progressively increasing length, and locking means to lock each of said housings in its respective barrel.

16. In a device of the type in which a plurality of flow valves in a flow line are adapted to release compressed gases into a column of fluid, said valves being operated by differentials in the pressure of the gases and the fluid, the combination of, a series of cylindrical barrels fixed to the flow line at different depths, a valve housing for each of said barrels, there being one flow valve in each housing each of said housings having upper and lower shoulders, the distance between the shoulders of each housing being different, the shortest of said distances being the distance between the shoulder of the uppermost housing and progressing until the longest distance is the distance between the shoulder of the lowermost housing and a locking means for each housing adapted to lock it in position within its respective barrel.

17. In a device of the type in which a plurality of flow valves in a flow line are adapted to release compressed gases into a column of fluid, said valves being operated by differentials in the pressure of the gases and the fluid, the combination of, a series of cylindrical barrels fixed to the flow line at different depths, a valve housing for each of said barrels, there being one flow valve in each housing each of said housings having upper and lower shoulders, the distance between the shoulders of each housing being different, the shortest of said distances being the distance between the shoulder of the uppermost housing and progressing until the longest distance is the distance between the shoulder of the lowermost housing and a locking means for each housing consisting of two spring actuated noses spaced apart slightly greater than the distance between the shoulders of the housing which is to be locked thereby.

18. In a device of the type in which a plurality of flow valves in a flow line are adapted to release compressed gases into a column of fluid, said valves being operated by differentials in the pressure of the gases and the fluid, the combination of, a series of cylindrical barrels fixed to the flow line at different depths, a valve housing for each of said barrels, there being one flow valve in each housing each of said housings having upper and lower shoulders, the distance between the shoulders of each housing being different, the shortest of said distances being the distance between the shoulder of the uppermost housing and progressing until the longest distance is the distance between the shoulder of the lowermost housing, a locking means for each housing consisting of two spring actuated noses spaced apart slightly greater than the distance between the shoulders of the housing which is to be locked thereby, and means to unlock said noses so that its housing may be removed from the flow line.

19. In a device of the type in which a plurality of flow valves in a flow line are adapted to release compressed gases into a column of fluid, said valves being operated by differentials in the pressure of the gases and the fluid, the combination of, a series of cylindrical barrels fixed to the flow line at different depths, a valve housing for each of said barrels, there being one flow valve in each housing each of said housings having upper and lower shoulders, the distance between the shoulders of each housing being different, the shortest of said distances being the distance between the shoulder of the uppermost housing and progressing until the longest distance is the distance between the shoulder of the lowermost housing, a locking means for each housing consisting of two spring actuated noses spaced apart slightly greater than the distance between the shoulders of the housing which is to be locked thereby, means to unlock said noses so that its housing may be removed from the flow line, and means to cause said noses to move in unison to locking or unlocking position.

HENRY U. GARRETT.